Oct. 29, 1935.  M. D. SPEER  2,019,199
AUTOMOBILE HEADLIGHT INDICATOR
Filed April 16, 1934
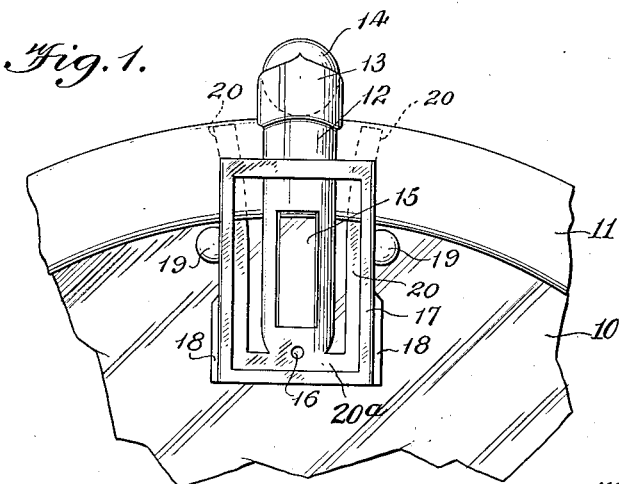
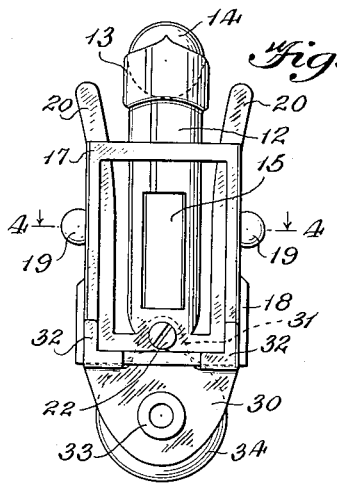
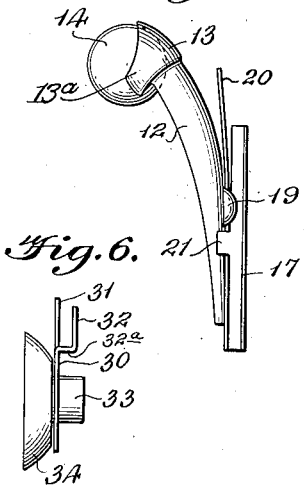
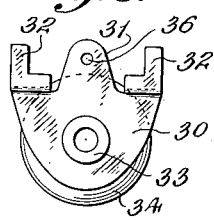
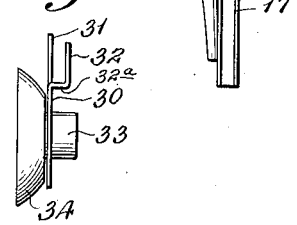
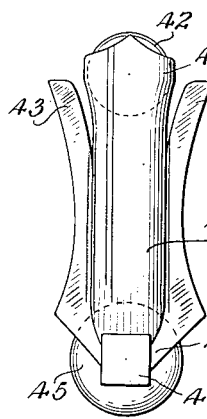
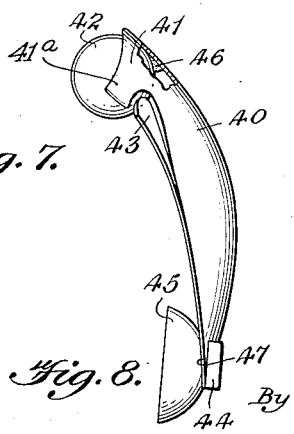
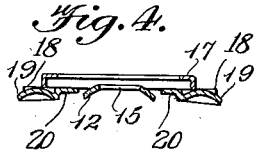
Inventor
M. D. Speer.
By Eugene E. Stevens
Attorney Patented Oct. 29, 1935

2,019,199

UNITED STATES PATENT OFFICE 2,019,199

AUTOMOBILE HEADLIGHT INDICATOR

Max D. Speer, Miami, Fla.

Application April 16, 1934, Serial No. 720,820

10 Claims. (Cl. 40—131)

This invention relates to an improvement in an automobile headlight indicator or indicators in which jewels or colored glasses or other transparent materials are held in the top of the tongue or center piece of the device by spring pressure; furthermore a frame is suggested on one model for the purpose of inserting therein a picture or a piece of transparent material which will be seen from the front of the headlight. Furthermore, the method of attaching said improved headlight indicator to the headlight and lens may be by means of rubber suction cups or otherwise and/or with the use of two concave shoulders of metal, the under sides of which are filled with a cement and affixed to the lens of the headlights.

The invention together with its numerous objects and advantages provides for an attachment to automobile headlights that will harmonize with the structural beauty of headlights to which it may be attached and also serve the practical use of informing the driver of the car whenever either one of the headlights may not be operating for any reasons whatsoever. These objects and advantages are best illustrated by the drawing and the following explanations.

In the drawing:

Figure 1 is a fragmentary elevation of the upper portion of an automobile headlight showing one of my improved indicators mounted thereon.

Figure 2 is a side view of the indicator shown in Figure 1 removed from the headlight.

Figure 3 is a front view of the indicator showing an additional attaching means.

Figure 4 is a section taken on the line 4—4 of Figure 3.

Figure 5 is a plan view of the additional attaching means shown in Figure 3.

Figure 6 is a side view thereof.

Figure 7 is a plan view of a modified form of the invention, and

Figure 8 is a side view of the modification shown in Figure 7.

With further reference to the drawing, wherein like reference characters have been used throughout to designate like parts, the reference character 10 indicates the glass lens of an automobile headlight and 11 the metal rim thereof. The indicator comprises a substantially semi-cylindrical member 12 which carries the transparent member or jewel 14 (which may or may not be colored) in its upper end. The transparent member 14 may be cemented to the body 12 (as shown at 46 in Fig. 8) or I may provide a clip 13 having rearwardly extending arms 13a formed thereon and which is suitably secured to the upper end of the body 12. It is to be noted that the body is slightly curved in a rearwardly direction so that light from the headlight will be reflected in an upward direction through the jewel 14 to inform the driver that the light is lit.

The lower end 20a of the body is flattened and provided with upwardly extending flexible finger-like portions 20, which carry cup-like portions 19 which extend laterally thereof on the outer sides. Side flanges 18 are provided at the flattened base of the body 12 to provide a flat contact with the lens 10. The lower part of the body 12 has a window 15 formed therein to permit light from the headlight to be projected through a frame 17 which may be removably carried by the body 12 by means of the lugs 21 which are adapted to be bent around the lower portions of the fingers 20 to mount the frame securely on the body.

As can be seen from Figure 1, the device is mounted on a headlight by inserting the fingers 20 between the rim 11 and the lens 10. This necessitates the fingers 20 being bent in a rearward direction to a considerable distance, and their natural resiliency suffices to pull the semi-cylindrical body tightly down on the outside of the rim 11, with the transparent member 14 extending slightly above the rim in full view of the driver. This spring mount would be, in most instances, sufficient to insure against the accidental dislodgment of the indicator. However, inasmuch as the fit between lens and rim is not always as tight as might be desired and also to serve as an extra precaution, I have provided the cups 19 on the lower parts of the fingers 20. These cups are so positioned that their rims are pressed against the lens when the indicator is mounted. By filling the cups with a suitable cement before mounting the indicator, the latter is securely fastened to the lens.

It is to be noted that when this form of indicator is mounted, the window 15 in the body is positioned below the rim 11 and light is allowed to project through the frame 17 in which may be mounted a transparent lens (not shown) bearing any suitable indicia or advertising matter.

In Figures 3, 5 and 6 is seen a supplemental means for attaching the indicator to the headlight. This consists of the vacuum cup 34 which is attached to a plate 30 by means of a stem 45 and button 33 on the top of the cup 34 and which extends through a reduced opening (not shown) in the plate 30. The plate 30 has an upwardly extending ear 31 having an aperture 36 therein. A correspondingly sized aperture 16 is formed in the body 12 just below the window 15. The ear 31 is extended beneath the flattened portion of the body until the openings 16 and 36 register and a bolt 22 is then passed through the openings to complete the connection. It will be noted also that the vacuum cup carrying plate 30 is further provided with laterally extending and offset keepers 32. These keepers 32 are substantially L-shaped and are adapted to overlie the lower corners of the frame 17 with the latter abutting the upstanding portions 32a of the offset keepers 32.

The vacuum cup 34 is applied in the usual manner, after being moistened, by being pressed against the lens 10 after the fingers 20 have been positioned between the lens 10 and rim 11.

Figures 7 and 8 show a simpler type of indicator comprising a semi-cylindrical and rearwardly curved body 40 having its upper end formed to provide a clip portion 41 having arms 41a for retaining therein a transparent member 42. Adhesive 46 may be used to augment the clip 41 in holding the transparent member 42 in position. The lower portion of the body 40 is flattened as at 47 and is provided with a pair of upstanding fingers 43 which are used exactly like those 20 of the other form of my invention. A suction cup 45 may be attached by means of its stem and button 44 to the flattened portion 47 of the body. If desired, portions equivalent to the cement carrying cups 19 may be added to this form of the invention.

It is, thus, apparent that my invention is susceptible of many changes in structure and form without departing from the spirit of my invention, and that I do not limit myself to the precise structure shown,—the drawing and description being designed to be illustrative rather than limitative.

Having thus described the invention, what I claim as new and what is desired to secure by Letters Patent, is:

1. An indicator for automobile headlights comprising a substantially semi-cylindrical body, said body being rearwardly curved slightly, a clip formed on the upper end of said body, a substantially spherical light transmitting member carried by said clip, a flattened portion at the lower end of said body, a vacuum cup carried by said flattened portion for attaching the lower end of said body to the lens of the headlight, upstanding fingers carried by said flattened portion and adapted for insertion between the lens and rim of the headlight, and adhesive carrying cups adjacent the bases of said fingers for cementing the same to the lens.

2. An indicator for automobile headlights comprising a substantially semi-cylindrical body, said body being rearwardly curved slightly, a clip formed on the upper end of said body, a substantially spherical light transmitting member carried by said clip, a flattened portion at the lower end of said body, upstanding fingers carried by said flattened portion and adapted for insertion between the lens and rim of the headlight, and adhesive carrying cups adjacent the bases of said fingers for cementing the same to the lens.

3. An indicator for automobile headlights comprising a substantially semi-cylindrical body, said body being rearwardly curved slightly, a clip formed on the upper end of said body, a substantially spherical light transmitting member carried by said clip, a flattened portion at the lower end of said body, upstanding fingers carried by said flattened portion and adapted for insertion between the lens and rim of the headlight, adhesive carrying cups adjacent the bases of said fingers for cementing the same to the lens, a window formed in said semi-cylindrical portion of said body to permit the passage of light therethrough, and a frame carried by said body in front of said window, said frame being adapted to carry a transparent, indicia bearing plate which is illuminated by the light passing through said window.

4. An indicator for automobile head lights comprising a substantially semi-cylindrical body, said portion being rearwardly curved slightly to reflect light from said headlight in a rearward direction, adhesive carrying cups on said body portion for attaching said body to the lens of a headlight, indicia carrying means carried by said body on the forward side thereof, and said body being formed to permit illumination of said indicia carrying means.

5. An indicator for automobile head lights comprising a substantially semi-cylindrical body, said portion being rearwardly curved slightly to reflect light from said headlight in a rearward direction, adhesive carrying cups on said body portion for attaching said body to the lens of a headlight, indicia carrying means carried by said body on the forward side thereof, and said body being formed to provide an aperture therein to permit the passage of light therethrough for the purpose of illuminating said indicia carrying means.

6. The structure of claim 5, an aperture in said semi-cylindrical body below said window, a plate having a laterally extending and apertured ear thereon, means for extending through said apertures in said body and ear to connect said body and plate together, offset keepers on the upper edge of said plate for overlying the lower corners of said frame, and a vacuum cup carried by said plate below said body.

7. An indicator for automobile headlights comprising a substantially semi-cylindrical body portion, said portion being rearwardly curved slightly, a flattened portion at the lower end of said body, upstanding flexible fingers formed on said flattened portion and adapted for insertion between the lens and rim of said headlight to retain said indicator in position on the latter, the upper end of said body having a clip member including rearwardly extending arms formed thereon, and a substantially spherical light transmitting member carried by said upper end of said body and retained thereat by said clip.

8. An indicator for automobile headlights comprising a body, a clip formed on the upper end of said body, a substantially spherical light transmitting member carried by said clip, supporting means formed on said body and insertable between the lens and rim of the headlight, and portions of said body being adapted to provide adhesive carrying means for cementing said body to the headlight lens.

9. An indicator for automobile headlights comprising a body, the upper portion of said body being formed to provide a clip, a light transmitting member carried by said clip, a portion of said body providing supporting members insertable between the rim and lens of the headlight, and means formed on said body for carrying an adhesive for cementing said body to a headlight lens.

10. In an indicator for automobile headlights comprising a body portion and a light transmitting member carried thereby, flexible members extending from said body portion and insertable between the lens and rim of a headlight, and adhesive carrying cups formed in said body portion for cementing the latter to the lens of a headlight.

M. D. SPEER.